Nov. 21, 1950   J. F. ECKLES   2,530,572
WHEEL SUPPORT WITH POWER ACTUATED CLAMPING MEANS
Filed May 20, 1946   3 Sheets-Sheet 1

INVENTOR.
J. F. Eckles
BY
ATTYS

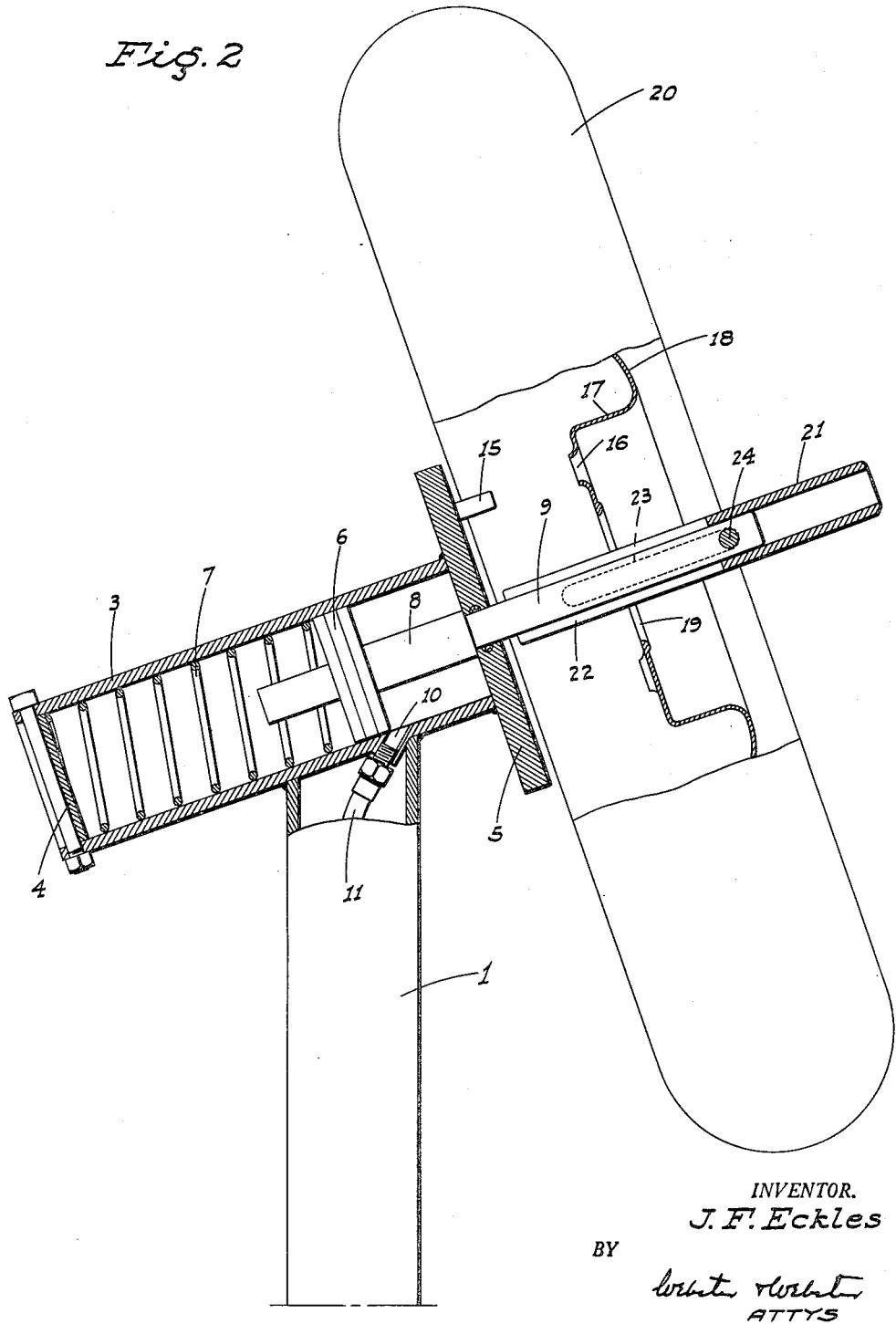

Nov. 21, 1950     J. F. ECKLES     2,530,572
WHEEL SUPPORT WITH POWER ACTUATED CLAMPING MEANS
Filed May 20, 1946     3 Sheets-Sheet 3

INVENTOR.
J. F. Eckles
BY
ATTYS

Patented Nov. 21, 1950

2,530,572

UNITED STATES PATENT OFFICE 2,530,572

WHEEL SUPPORT WITH POWER ACTUATED CLAMPING MEANS

Jesse F. Eckles, Porterville, Calif.

Application May 20, 1946, Serial No. 671,010

1 Claim. (Cl. 144—288)

This invention relates in general to a piece of equipment adapted to facilitate the removal or mounting of motor vehicle tires of the type used on wheels having integral rims.

In particular the invention is directed to, and it is an object to provide, a wheel standard, of novel construction, arranged to positively and rigidly support a wheel at a convenient working height above the floor whereby a tire may be readily and easily removed from, or mounted on, the wheel by one person.

Another object of the invention is to provide a wheel supporting standard, for the purpose described, which includes clamping means operative to forcefully but releasably secure the wheel to a face plate; the clamping means being operated through the medium of a valve controlled, fluid pressure actuated power cylinder.

A further object of the invention is to provide a wheel-supporting standard which disposes the wheel, not only above floor for ready access, but also in a canted position to further facilitate the operator's manipulation of a tire being removed from, or mounted on, the wheel.

A further object of the invention is to provide a wheel supported standard which is practical, and effective for the purposes for which it is designed.

These objects are accomplished by means of such structure and relative arrangement of parts as will fully appear by a perusal of the following specification and claim.

In the drawings:

Fig. 2 is an enlarged fragmentary elevation, mainly in section, showing the position of the parts to permit of initial placement of a wheel against the face plate.

Figure 1:
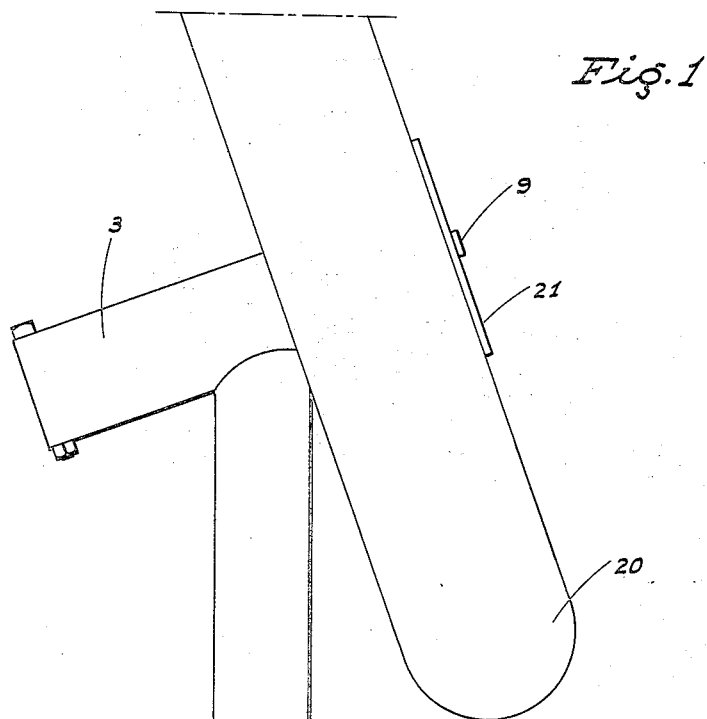
Fig. 1 is a side elevation of the wheel supporting standard as in use.
Figure 4:
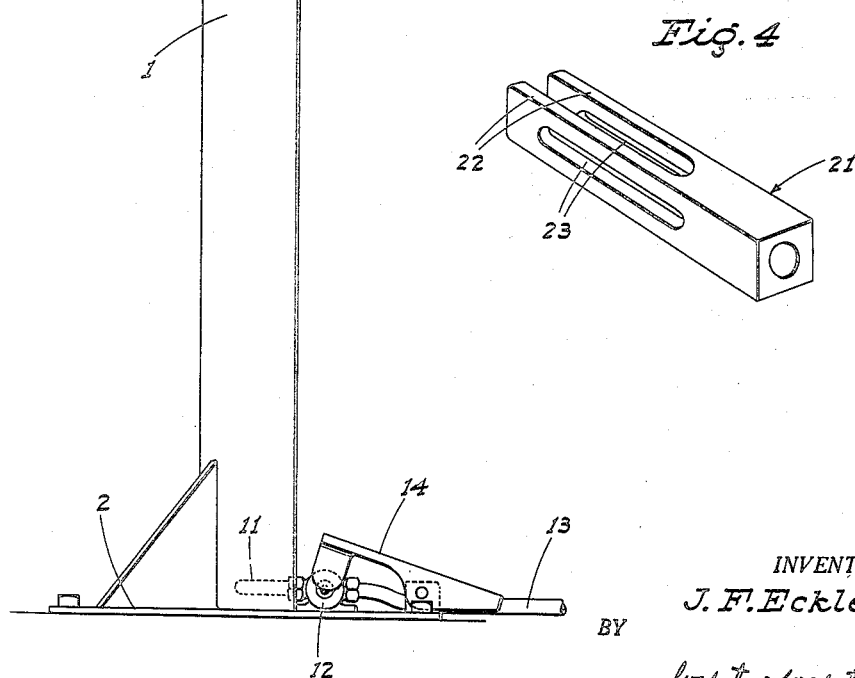
Fig. 4 is a perspective view of the forked clamping bar, detached.

Referring now more particularly to the characters of reference on the drawings, the device comprises a rigid tubular standard 1 fixed, at its lower end, on a base 2, which base is adapted to be fixed to the floor by screws or bolts.

At its upper end the tubular standard 1 fixedly supports a transversely extending cylinder 3 intermediate the ends of the latter, said cylinder being disposed at an upward incline from its rear end.

The rear end of the cylinder 3 is closed by a head 4, while the front end of said cylinder is closed by a circular face plate 5 secured concentrically and radially to said cylinder in rigid relation. The face plate 5 is thus canted relative to vertical, i. e. faces with its axis extending at an outward and upward incline.

A piston 6 is disposed in the cylinder 3 and is normally advanced by a compression spring 7 engaged between said piston 6 and the closure head 4. Advance of the piston 6 is limited to the point shown in Fig. 2 by means of a spacer sleeve 8 surrounding a piston rod 9 between said piston 6 and face plate 5. From the piston 6 the piston rod 9 extends through the sleeve 8, slidably through the face plate 5, and thence extends to a termination some distance beyond the latter.

A port 10 leads into the cylinder 3 from within the tubular standard 1 at a point directly ahead of the most advanced point of the piston 6. A conduit 11 communicates with said port 10 and extends therefrom downwardly through the tubular standard 1 and out of the lower end thereof to connection with one side of valve 12 mounted on the base 2. The other side of the valve is connected with an air pressure supply conduit 13. The valve 12 is a double-acting type, i. e. of a type such that in one position of the valve, air pressure from conduit 13 feeds to conduit 11, while in the other position of the valve feed from conduit 13 is blocked and the conduit 11 is opened to atmosphere. A two-position foot pedal 14, pivotally mounted on the base 2, controls the valve 12. When the foot pedal 14 is depressed at the front thereof the valve 12 is shifted to said one position thereof, wherein conduit 13 is connected in communication with conduit 11, whereas when the foot pedal is depressed at the rear, as in Fig. 1, the valve 12 is shifted to said other position wherein conduit 11 is exhausted to atmosphere.

The face plate 5 is provided, adjacent the top thereof, with a radially offset, forwardly projecting pin 15 spaced from the axis of the piston rod 9 a predetermined distance. The spacing of the pin 15 from the piston rod 9 is such that said pin 15 engages through one of the wheel lug receiving holes 16 formed in a wheel hub 17 when the wheel 18 is disposed with said hub against the face plate 5, with the piston rod 9 projecting axially through the central opening 19 of said hub 17. The tire on the wheel 18 is indicated at 20.

The outer end portion of the piston rod 9 is straddled by a forked, clamping bar, indicated generally at 21, the legs of said forked clamping bar being indicated at 22.

Said legs 22 are longitudinally slotted in matching relation, as at 23, and a transverse guide pin 24 on the piston rod 9 rides in said slots.

Figure 3:
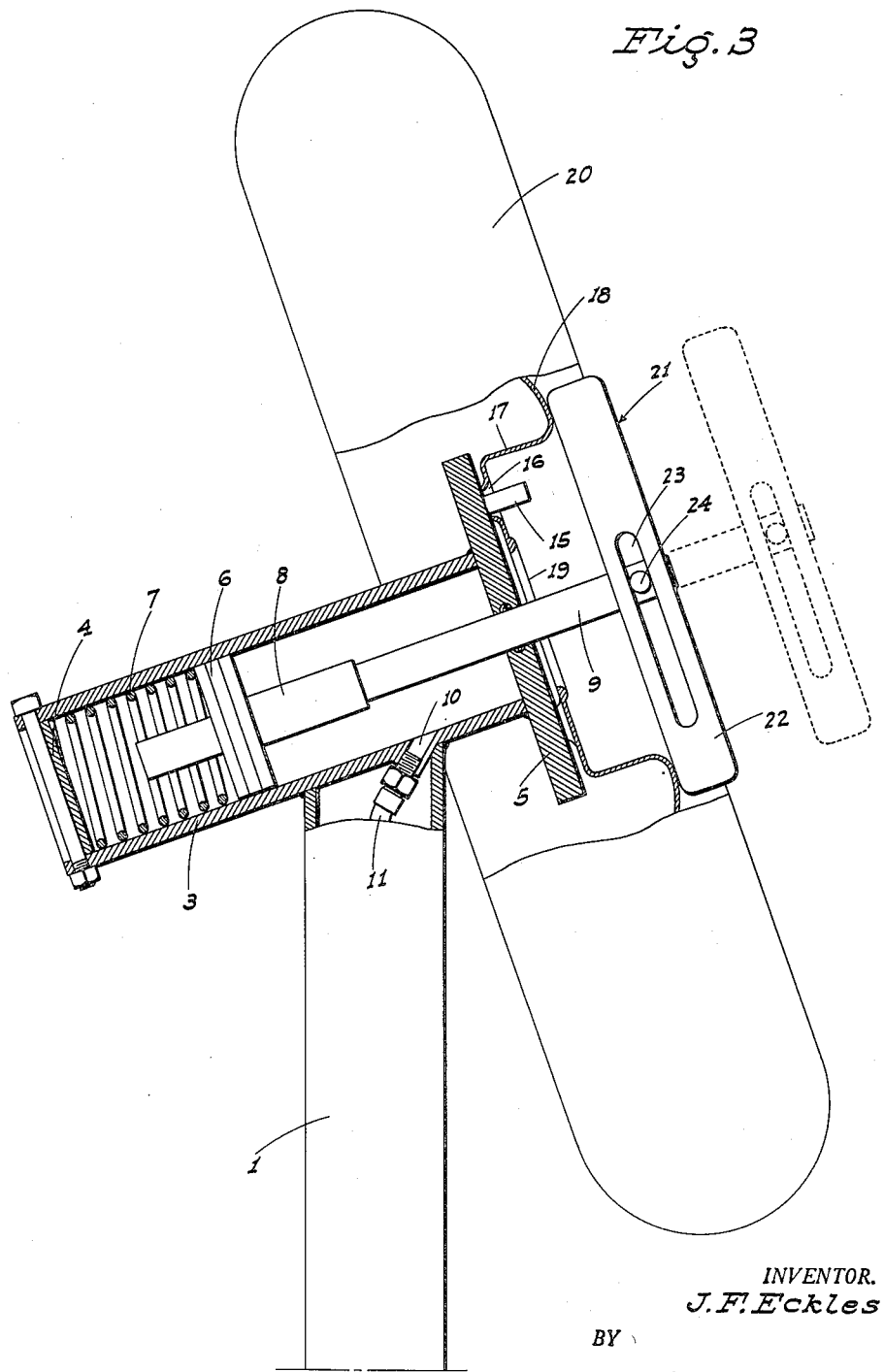
Fig. 3 is a similar view, but shows the position of the parts with the wheel clamped against said face plate in supported relation.

By reason of this arrangement the forked clamping bar 21 is swingable between a position in longitudinal alinement with the piston rod 9, as shown in Fig. 2, to a transverse position, as shown in Fig. 3.

At the outset the piston 6 is advanced and the clamping bar 21 is longitudinally alined with the piston rod 9, both as shown in Fig. 2. With the parts in this position the wheel 18 is placed against the face plate 5, with the pin 15 engaging in one of the holes 16 of the wheel hub 17.

With the wheel so disposed, the forked clamping bar 21 is swung to its lateral position, but is then disposed outwardly of the wheel hub 17, as shown in dotted lines in Fig. 3. The operator then depresses the foot pedal 14 at its forward end, opening the valve 12 to establish communication between the conduit 13 and conduit 11, resulting in delivery of pressure into the cylinder ahead of the piston 6, which causes said piston to retract against the spring 7. When this occurs the piston rod 9 shifts axially inwardly, drawing the then transverse clamping bar 21 into positive engagement with the wheel hub 17, as shown in full lines in Fig. 3. In this manner the wheel 18, with the tire 20 thereon, is positively secured against the face plate 5, so that the operator may thereafter readily and easily manipulate the tire 20 for the purpose of removing it or mounting it on the wheel; which manipulation is facilitated by the canting of the wheel, as supported on the face plate.

To remove the wheel from the device, the foot pedal 14 is shifted to the position shown in Fig. 1, whereupon the valve 12 opens the conduit 11 to atmosphere, permitting the piston 6 and connected parts to advance to starting position; the forked clamping bar then being swung to its alined position with the piston rod 9, and the wheel 18 removed.

The clamping bar includes a central bore, as shown, beyond one end of the slots so that the outer end of the piston rod may project into such bore when the rod is in its longitudinal position whereby to then maintain the bar in such position. A slight outward movement of the bar relative to the rod releases said bar for movement to the described transverse position.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from a spirit of the invention, as defined by the appended claim.

Having thus described the invention, the following is claimed as new and useful, and upon which Letters Patent are desired:

A wheel holder comprising a support, a cylinder, a face plate fixed to one end of the cylinder, a piston movable in said cylinder, means to effect movement of said piston, a piston rod on the piston and projecting through the face plate, a cross pin on the rod adjacent its outer end, a clamping block having a bore at one end to slidingly fit the outer end of the rod, the opposite end of the block being forked, the legs of the forked portion being longitudinally slotted, said pin projecting into said slots, the slots being of a length to project beyond the plane of the inner end of the bore whereby when the rod is projected into the bore the pin will be effective to lock the bar and rod in axial alinement with each other.

JESSE F. ECKLES.

REFERENCES CITED

The following references are of record in the file of this patent:

UNITED STATES PATENTS

| Number | Name | Date |
|---|---|---|
| 656,057 | Stephens | Aug. 14, 1900 |
| 1,978,673 | Holford et al. | Oct. 30, 1934 |
| 2,043,169 | Hawkinson | June 2, 1936 |
| 2,065,644 | Bristol | Dec. 29, 1936 |
| 2,081,402 | Krema | May 25, 1937 |
| 2,163,469 | Raschka | June 20, 1939 |
| 2,178,101 | Hatch | Oct. 31, 1939 |